(12) United States Patent
Kim et al.

(10) Patent No.: US 8,942,175 B2
(45) Date of Patent: Jan. 27, 2015

(54) METHOD FOR CONTROLLING MTC SERVICE NETWORK OVERLOAD IN MOBILE COMMUNICATION SYSTEM AND DEVICE THEREOF

(75) Inventors: Hyunsook Kim, Anyang-si (KR);
Laeyoung Kim, Anyang-si (KR);
Taehyeon Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 127 days.

(21) Appl. No.: 13/696,039

(22) PCT Filed: May 4, 2011

(86) PCT No.: PCT/KR2011/003349
§ 371 (c)(1),
(2), (4) Date: Nov. 2, 2012

(87) PCT Pub. No.: WO2011/139098
PCT Pub. Date: Nov. 10, 2011

(65) Prior Publication Data
US 2013/0044594 A1    Feb. 21, 2013

Related U.S. Application Data

(60) Provisional application No. 61/330,892, filed on May 4, 2010.

(30) Foreign Application Priority Data

May 4, 2011   (KR) .................. 10-2011-0042291

(51) Int. Cl.
*H04W 4/00* (2009.01)
*H04W 28/04* (2009.01)
*H04W 48/08* (2009.01)
(Continued)

(52) U.S. Cl.
CPC ............... *H04W 4/00* (2013.01); *H04W 4/005* (2013.01); *H04W 28/04* (2013.01); *H04W 48/08* (2013.01); *H04W 68/00* (2013.01); *H04W 76/02* (2013.01)
USPC ........................... 370/328; 370/235; 370/400

(58) Field of Classification Search
CPC ............................. H04L 47/741; H04L 47/10
USPC .............. 370/229, 230, 230.1, 231, 232, 233, 370/234, 235, 236, 465
See application file for complete search history.

(56) References Cited

U.S. PATENT DOCUMENTS 6,097,700 A * 8/2000 Thornberg et al. ........... 370/233
6,711,129 B1 * 3/2004 Bauer et al. ................... 370/230
(Continued)

FOREIGN PATENT DOCUMENTS

| KR | 1020060073673 | 6/2006 |
| KR | 1020090126566 | 12/2009 |
| KR | 1020090131373 | 12/2009 |

*Primary Examiner* — Kevin Mew
(74) *Attorney, Agent, or Firm* — Lee, Hong, Degerman, Kang & Waimey

(57) ABSTRACT

The present invention relates to a method for controlling an overload of a network, which may be generated due to a service request of a terminal in a mobile communication system of machine type communication (MTC). The invention controls a network overload and efficiently use network resources, by requesting activation of a particular MTC function to the network on the basis of information on changes in unnecessary MTC functions, without allowing a terminal to request (for example, attach request) the unnecessary MTC functions.

10 Claims, 4 Drawing Sheets

(51) Int. Cl.
*H04W 68/00* (2009.01)
*H04W 76/02* (2009.01)

(56) References Cited

U.S. PATENT DOCUMENTS

| | | | |
|---|---|---|---|
| 6,738,819 B1* | 5/2004 | Li et al. | 709/229 |
| 8,121,602 B2* | 2/2012 | Yi et al. | 455/436 |
| 8,549,287 B2* | 10/2013 | Sarkkinen et al. | 713/163 |
| 2007/0082682 A1* | 4/2007 | Kim et al. | 455/456.1 |
| 2008/0151818 A1* | 6/2008 | Brueck et al. | 370/329 |
| 2012/0026961 A1* | 2/2012 | Pittmann et al. | 370/329 |
| 2012/0282956 A1* | 11/2012 | Kim et al. | 455/466 |
| 2013/0088956 A1* | 4/2013 | Zhou et al. | 370/230 |
| 2013/0286879 A1* | 10/2013 | ElArabawy et al. | 370/252 |
| 2013/0329559 A1* | 12/2013 | Cabrera | 370/235 |

\* cited by examiner

METHOD FOR CONTROLLING MTC SERVICE NETWORK OVERLOAD IN MOBILE COMMUNICATION SYSTEM AND DEVICE THEREOF

CROSS-REFERENCE TO RELATED APPLICATIONS

This application is the National Stage filing under 35 U.S.C. 371 of International Application No. PCT/KR2011/003349, filed on May 4, 2011, which claims the benefit of earlier filing date and right of priority to Korean Patent Application No. 10-2011-0042291, filed on May 4, 2011, and also claims the benefit of U.S. Provisional Application Ser. No. 61/330,892, filed on May 4, 2010, the contents of which are all hereby incorporated by reference herein in their entirety.

BACKGROUND OF THE INVENTION

1. Field of the Invention

The present invention relates to a mobile communication system and, more particularly, to controlling a network overload due to a machine type communication (MTC) data communication in an MTC service of a mobile communication system.

2. Related Art

In a 3rd generation partnership project (3GPP) which enacts technical specifications of a third generation mobile communication system, in order to cope with various forums and new technologies associated with a fourth generation mobile communication, a research on a long term evolution/evolved packet core (LTE/EPC) technology has been conducted since an end of 2004 in an effort to improve and optimize performance of a 3GPP technology. A study of the EPC focused on 3GPP SA WG2 is related to a network technology directed to determine a structure of a network, together with the LTE on 3GPP TSG RAN, and to support for mobility between heterogeneous networks, and is one of important recent 3GPP standardization issues. This is an effort to develop a 3GPP system into a system that supports various wireless access technologies based on an IP and a work has been progressed with a goal of an optimized packet based system which minimizes a transmission delay with an improved data transmission capability.

Hereinafter, technical terms used in the description of the present invention will be described.

An MTC feature is a feature for supporting a communication between machine type communication (MTC) devices or a communication between the MTC device and an MTC server, in which the communication is performed without a human intervention therebetween, unlike an existing person-to-person connection. For example, an MTC application includes a communication between a vending machine and a server, a point of service (POS) device and a server, and an electricity or water meter and a server. Here, a corresponding device is referred to as the MTC device. The MTC may be referred to as a machine-to-machine communication or device-to-device communication.

A tracking area (TA) refers to an area in which E-UTRAN provides a service and includes one or plural E-UTRAN cells.

A routing area (RA) refers to an area GERAN/UTRAN provides a service and includes one or plural GERAN/UTRAN cells.

A tracking area identity (TAI) list refers to a list of TAIs that identify the tracking that the UE can enter without performing a tracking area updating procedure. The TAIs in a TAI list assigned by an MME to a UE pertain to the same MME area. For a detailed description of the TAI list, a quotation to a disclosure of a standard document 3GPP TS 24.301 v9.1.0 is used.

A mobility management entity (MME) area is the part of the network served by an MME. An MME area consists of one or several tracking areas. All cells served by an eNodeB are included in an MME area. For a detailed description of the MME area, a quotation to a disclosure of a standard document 3GPP TS 23.002 v9.2.0 is used.

UMTS: Universal Mobile Telecommunication System, which is a 3G network.

EPS: Evolved Packet System, which is used to collectively refer to a core network (an evolved packet core), various access networks, and terminals that support the network. In addition, the EPS is an advanced form of the UMTS network.

NodeB: a base station of the UMTS network, which is installed outdoor and has coverage of a macro cell size.

eNodeB: a base station of the EPS network, which is installed outdoors and a service coverage of a micro cell size.

UE: User Equipment, which means a terminal device.

IMSI: International Mobile Subscriber Identity, which is a unique identification of a user that is solely assigned on an international level in a mobile communication network.

SIM card: Subscriber Identity Module include, which includes user or subscriber information such as IMSI.

UICC: Universal Integrated Circuit Card that is used as a SIM card.

MTC: Machine Type Communication means to the communication that occurs between devices without human intervention.

MTC device: a terminal (UE) such as, for example, a vending machine, probes, etc., which has a communication capability through the core network and performs a particular object.

MTC server: a server on a network which manages the MTC device and sends and receives a data. The MTC server may be located outside of the core network.

MTC application: the actual application using the MTC device and the MTC server, which includes, for example, remote meter reading, shipment movement tracking, etc.

MTC feature: a function or feature of a network for supporting the MTC applications. A portion of specific features are required for a purpose of each application.

For example, MTC monitoring (necessary for, e.g., remote meter reading in preparation for lost equipment), low mobility (in a case of a vending machine, movement hardly exists), etc. may be required.

RAN: Radio Access Network, which is used to collectively refer to a 3GPP wireless access such as RNC, NodeB, and eNodeB.

HLR (home location register)/HSS (home subscriber server): database (DB) indicating the subscriber information within the 3GPP network.

RANAP: An abbreviation for Radio Access Network Application Part, which means an interface between RAN and a node (MME/SGSN/MSC) that is responsible for controlling the core network.

Cell camping (or camp) on state refers to a state in which the terminal selects a cell after completing a cell selection process or a cell reselection process. For a detailed description thereof, a quotation to a disclosure of a standard document 3GPP TS 36.304 v9.1.0 is used.

ISR (idle mode signaling reduction) is a service for improving efficiency of a network resource by, for example, reducing signaling for registering a location when the terminal moves between different access networks such as the E-UTRAN and the UTRAN/GERAN.

ICS (IMS centralized services) provides a consistent service to an IMS regardless of the access network to which the terminal is attached (i.e., even if the terminal is attached to not only IP-CAN but also to CS domain). For a detailed description thereof, a quotation to a disclosure of a standard document 3GPP TS 23.292 v9.4.0 is used.

IMS (IP multimedia subsystem) is a system which provides a multimedia service on an IP basis.

Attach refers to a connection of the terminal to a network node, and, in a broad sense, includes an attach generated with a handover.

Hereinafter, the present invention will be described with reference to the technical terms described above.

FIG. 1 is a conceptual view illustrating a 3GPP service model for supporting the MTC.

Although 3GPP standard GSM/UMTS/EPS define a communication through a PC network for supporting the MTC, the present invention describes a method which is also applicable in a CS network.

In current technical specifications, a definition of a network structure has been proposed with using an existing bearer of 3GPP. On the other hand, using a short message service (SMS) for a data exchange between the MTC device and the MTC server has been proposed as one of alternative solutions. Using the SMS is suggested by considering a fact that the MTC application is characterized to apply to a small amount of a digital data such as metering information or product information, and an existing SMS approach and an SMS approach based on the IMS may be supported. Referring to FIG. 1, MTCsms is a data exchange interface through the existing SMS approach, and MTCi is a data exchange interface for a 3GPP bearer service and the IMS.

Hereinafter, an overload control in the MTC service will be described.

Examples of an overload occurring in the MTC are as follows: when performing a wrong function of the MTC server or the MTC application; when an external event occurs in which a number of MTC devices are connected; and when a specific program is set to repeatedly operate at a specific time. In this case, operating the MTC application program in connection with the core network is realistically very difficult to implement. It is because core network nodes (SGSN/MME/PGW, etc.) are easily damaged due to traffic congested data.

Therefore, a method of controlling the overload that occurs in the conventional core network nodes are as follows.

1) The network node may reject a particular connection. To determine whether to reject such connection, an APN or MTC group may be used. Alternatively, the MTC device may be controlled to connect to the network node at only a certain predefined time. However, in case of a congested condition, by sending a back off time from the network node to the MTC device, the network node may provide the MTC device with information which enables the MTC device not to connect during that time.

2) There exists a method in which a location of TAU/RAU, i.e., a cell to which the MTC device belongs, is updated before the MTC device is used at the certain predefined time. However, this is for purpose of registering an exact location before use because the MTC device has not been used for a long time. In this case, the MTC device has been in an off state for a long time, and therefore, information of an access location needs to be updated, however, the above method cannot be a fundamental solution to the problem.

3) The MTC device randomizes an access start time at which the MTC device is connected to the network node within the certain predefined time. The purpose of this is to avoid a concentrated traffic at the certain predefined time. Such method may be triggered in the MTC server of the MTC device;

On the other hand, when the overload occurs at the MTC and a network condition is changed, an attach requested to the network by the MTC device may be rejected, thereby causing an unnecessary loss to the network resource. Hereinafter, an example of an attach procedure and the network overload which is caused when the network rejects an attach request of the MTC device will be described.

In a conventional mobile communication system which supports the MTC service, the attach procedure of the MTC device is as follows: 1) the MTC device (terminal) registers the subscriber information with the MTC server. In other words, a user of the MTC device may, for example, set or change an activation or deactivation state of each MTC feature though a method such as a web based registration. A result of setting the activation or deactivation state of each MTC feature is stored in the core network. 2) The network identifies the subscriber information at a time point when the terminal attaches to the network (or the core network node). In other words, at the time point when the MTC device attaches the network, the core network nodes (for example, MME) determine whether to accept a corresponding terminal (i.e., MTC device) in the network by bringing the subscriber information through an interaction with a subscription registration server (e.g., HSS). 3) On the other hand, when the attach request of the terminal (e.g., request for activating a specific MTC feature) cannot be supported according to the network condition such as an operator policy, the network determines to reject the attach request of the terminal

SUMMARY OF THE INVENTION

In the prior art described above, each machine type communication (MTC) feature of an MTC device is stored in a core network and a situation occurs in which a specific MTC feature cannot be activated due to a condition of the core network or another MTC feature may not be supported according to a capability of the network. In other words, a terminal (MTC device) may, without recognition, send an attach request to the network at a preset time or upon generation of an event and the network rejects the request of the terminal, thereby causing a technical problem of an unnecessary waste of a resource.

Such technical problem is caused because a change to service support of the MTC features is made on a network side.

Therefore, the present invention suggests a method of controlling a network overload and efficiently using a network resource by generating and transmitting information about a change to the MTC features in the network to the terminal such that the terminal may not request unnecessary MTC features (e.g., attach request) and request an activation of a specific MTC feature to the network based on the information about the change to the MTC features.

In an aspect, a method of controlling a network overload in a mobile communication system is provided. The method includes, receiving and storing, by a terminal, information about a control of the network overload from a network node;

determining, by the terminal, whether a service request to the network node is to be rejected or accepted by analyzing the stored information about the control of the network overload; and transmitting, by the terminal, a message requesting a service to the network node when it is determined that the network node is to accept the service request.

The information about the control of the network overload may include, information indicating an activation state of machine type communication (MTC) features associated with the terminal The information about the control of the network overload may comprise at least one of, a list of activation of MTC features supportable by the network node with respect to the terminal;

a list of deactivation of the MTC features of the terminal by the network node;

a list of MTC features the terminal is capable of or need to activate or a list of MTC features the terminal is capable of or need to deactivate;

an incompatible setting among the MTC features of the terminal;

a parameter value of a corresponding MTC feature for avoiding the incompatible setting among the MTC features of the terminal;

information in a form of combination of each MTC feature and an on/off flag, among the MTC features of the terminal; and if information previously transmitted to the terminal by the network node exists, updated information of corresponding information.

The message requesting the service may comprise at least one of, information about MTC features the terminal wants to activate;

information about MTC features in an activation state currently stored in the terminal; information about a device capability currently supportable by the terminal and/or information about corresponding MTC features; and information about user preference for the MTC features of the terminal In another aspect, a method of controlling a network overload in a mobile communication system is provided. The method includes, receiving, by a network node, a message requesting a service from a terminal;

receiving, by the network node, information about machine type communication (MTC) features of the terminal from a subscriber registration server;

determining, by the network node, by considering the received information about the MTC features of the terminal, a network condition, and an operator policy, whether to reject or accept a service request of the terminal; and transmitting, by the network node, a message of accepting or rejecting the service request together with information about a control of the network overload to the terminal, based on the determination.

The method may further include generating, by the network node, by considering the received information about the MTC features of the terminal, the network condition, and the operator policy, the information about the control of the network overload.

The method may further include updating the information about the control of the network overload generated by the network node to the subscriber information server.

The information about the control of the network overload, the information about the control of the network overload may comprise, a list of activation of MTC features supportable by the network node with respect to the terminal;

a list of deactivation of the MTC features of the terminal by the network node;

a list of MTC features the terminal is capable of or need to activate or a list of MTC features the terminal is capable of or need to deactivate;

an incompatible setting among the MTC features of the terminal;

a parameter value of a corresponding MTC feature for avoiding the incompatible setting among the MTC features of the terminal;

information in a form of combination of each MTC feature and an on/off flag, among the MTC features of the terminal;

and if information previously transmitted to the terminal by the network node exists, updated information of a corresponding information.

The message requesting the service may comprise at least one of, information about MTC features the terminal wants to activate;

information about MTC features in an activation state currently stored in the terminal; information about a device capability currently supportable by the terminal and/or information about corresponding MTC features; and information about user preference for the MTC features of the terminal The terminal may be an MTC device capable of supporting an MTC service, and the network node may be a mobility management entity (MME), a serving GPRS support node (SGSN), or a mobile telephone switching (MSC).

In still another aspect, a mobile communication terminal is provided. The mobile communication terminal includes, a transmission and receiving unit configured to request a service to a network node, and configured to receive, from the network node, information about a state of MTC features, information about a cause for rejection to a request for the service, and information about MTC features currently capable of being activated;

a storage unit configured to store the information about the state of MTC features, the information about the cause for rejection to the request for the service, and the information about the MTC features currently capable of being activated, received from the network node; and a controller configured to control a network overload by determining whether to request the service to the network by considering the received information such that the network overload is not generated.

The present invention, in a mobile communication system that supports a machine type communication (MTC) service, prevents a terminal from requesting an unnecessary MTC feature to a network based on information of a change of MTC features (or a list of activation/deactivation of the MTC features) generated in the network, thereby controlling an overload of the network and improving quality of the MTC service and efficiency of utilizing a network resource.

Also, in the present invention, based on whether MTC features which are registered when the terminal (i.e., an MTC device) is subscribed are activated, a network condition (i.e., a home network condition and a visited network condition), and an operator policy, the terminal may not request an unnecessary service, thereby efficiently maintaining the overload of the network in an MTC environment.

Also, the present invention avoids waste of a wire/wireless network resource in the MTC environment in a 3rd generation partnership project (3GPP) GSM/UMTS/EPS system. Particularly, compared with a conventional communication, in the MTC environment in which a number of MTC devices simultaneously attempt a communication, waste of a resource due to an unnecessary service request by the terminal may be prevented.

Also, the present invention may improve quality of the service experienced by a user by flexibly activating the MTC features in the MTC device.

DESCRIPTION OF EXEMPLARY EMBODIMENTS

Figure 1:
FIG. 1 is a conceptual view illustrating a 3rd generation partnership project (GPP) service model for supporting a machine type communication (MTC)

The present invention applies to a mobile communication system using a machine type communication (MTC). However, the present invention is not limited thereto and may apply to a next generation mobile communication and other wire or wireless communication to which the technical spirit of the present invention may apply.

While various modifications and example embodiments can be made, only particular example embodiments will be described more fully herein with reference to the accompanying drawings. However, the present invention should not be construed as limited to only the example embodiments set forth herein but rather should be understood to cover all modifications, equivalents or alternatives falling within the scope and technical terms of the invention.

It will be understood that, although the terms first, second, etc. may be used herein to describe various elements, these elements should not be limited by these terms. These terms are only used to distinguish one element from another. For example, a first element could be termed as a second element, and, similarly, a second element could be termed a first element, without departing from the claim scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

A terminal according to the present invention refers to all types of apparatus that can perform a technical feature of the present invention. In other words, the terminal has a comprehensive meaning including a mobile communication terminal (e.g., a cardiac pacemaker, a vending machine, an electricity meter, an air pollution measuring instrument, etc.), user equipment (UE), and other human-related devices (e.g., a mobile phone, a portable phone, a digital multimedia broadcasting (DMB) phone, a game phone, a camera phone, a smart phone, etc.), and a notebook computer, a desktop computer, a laptop computer, a palmtop computer, a personal digital assistant (PDA), white goods, etc., which can perform a machine type communication (MTC) feature according to the present invention.

Exemplary embodiments of the present invention are described with reference to the accompanying drawings in detail. The same reference numbers are used throughout the drawings to refer to the same parts regardless of drawing numbers and a repetitive explanation will be omitted.

In a 3rd generation partnership project (3GPP) mobile communication system that supports the MTC feature, a data communication to which a non-human activity related MTC device is involved is operated in a preset state, and when such data communication is congested in a particular time, a congestion state may occur by congestion of the data communication (or traffic) and other forms of communication (for example, human-to-human) may be disturbed.

In other words, the present invention is conceived in view of a problem that the data communication falls into a congestion/overload state in such mobile communication system that supports an MTC service. The present invention suggests a function and an operation of a network according to the present invention which can solve the congestion state generated in connection with the MTC data communication. Thus, the present invention may prevent the congestion state of the data communication beforehand and properly distribute the data communication when the congestion state of the data communication occurs, thereby efficiently using a wireless resource or a resource of a core network.

The present invention is conceived to efficiently use a network resource by preventing a network overload which can be generated because a terminal (i.e., MTC device) is not aware of a network state.

A basic concept of the present invention is to 1) register respective functions of the MTC device with an MTC server, 2) transmit to the terminal, by the core network, information (or list) updated with a change to the MTC features when the change is made to the registered MTC features of the MTC device; and 3) transmit, by the terminal, a request for the MTC feature to the network based on the received information such that the terminal does not send a request for an MTC service that is not supported by the network.

Hereinafter, examples of detailed situations to which exemplary embodiments of the present invention may apply are described. The exemplary embodiments of the present invention includes, for example, 1) when the terminal roams; 2) when a network operator changes a network setting with respect to the MTC feature; 3) support for a specific MTC feature is difficult because capability of the network is changed; and 4) an incompatible setting among the MTC features is generated in the network. Hereinafter, each situation to which an exemplary embodiment of the present invention applies is described.

1) An Exemplary Embodiment in which the Terminal Roams and the Terminal is not Aware of a Network Condition There exists a case where the terminal roams to a visited network from a home network so that an MTC feature supportable by a current network cannot be known. In other words, for example, in an MTC environment network which concentrates in providing a so-called e-health care service, it is assumed that a user or a terminal which uses the e-health care service uses the following features among various MTC features: i.e., "Small data transmission," "Frequent data transmission," "Infrequent mobile terminated," and "Priority alarm," etc.

It is assumed that the terminal moves from the home network to the visited network. It is assumed that the visited network to which the terminal moves does not have an optimal MTC environment network for the e-health care service, however, the "Small data transmission" and the following MTC features are currently available to be provided: i.e., MTC features such as "Low Mobility," "Time Control," "Time Tolerant," "Group Based Charging," "PS Only," "Small Data Transmission," etc.

In this case, if the terminal (or MTC user) may know a state of the MTC features supported by the visited network, whether to continue to use the e-health care service which is limited to the "Small data transmission" supported by the currently visited network (for example, although an emergency alarm is not available, the user may send his or her body measurement and receive a proper feedback) or whether to not receive an entire e-health care service, thereby sending a proper service request to the network. Meanwhile, here, determination of the terminal (or MTC user) may be determined directly through a user interface or may be determined by utilizing a pre-configuration value.

If a supporting state of the MTC features of the visited network which the terminal moves to and camps on can be known, the terminal, for example, may not send a request for using a priority alarm feature which is not supported by the visited network, thereby preventing waste of the network resource.

2) An Exemplary Embodiment in which the Network Operator Changes a Network Setting Related to the MTC Feature and the Terminal is not Aware of Such Network State It is assumed that a network under which the terminal is currently serviced provides the following MTC features: "Small Data Transmission," "Frequent data transmission," "Infrequent mobile terminated," "Priority alarm," etc.

It is assumed that the operator is to disable (or deactivate) several MTC features at a particular time point as a way of policy of the network overload and network management. For example, in a network state in which the MTC features such as "Frequent data transmission" or "Small data transmission" are disabled due to the network overload at a particular time point, if the network receives a request for an MTC feature such as "frequent data transmission service" for the MTC service from the terminal, the network rejects the request.

In other words, when the terminal first connects to the network, the terminal is operated only with a knowledge of the MTC features that are supposed to be supported by the network and sends a service request to the network at a particular time point at which the MTC feature of the "frequent data transmission" is generated (or when an event is generated). However, since the MTC feature of the "frequent data transmission" is disabled, the service request is rejected. In such a case, as a result, the network resource is wasted as the terminal requests the terminal for the MTC service with respect to the disabled MTC feature.

3) An Exemplary Embodiment in which the Capability of the Network is Changed Such that a Specific MTC Feature cannot be Supported by the Network and the Terminal is not Aware of Such Network State It is assumed that the terminal is currently provided with the "small data transmission" feature among the MTC features from the network. Here, the network uses the "small data transmission" by using a short message system (SMS) scheme in the network, and a situation may occur in which the current network is disconnected from an SMS server which provides the MTC service or a resource for providing the SMS service is in a shortage such that the MTC feature of the "small data transmission" may not be supported. Here, when the terminal first connects to the network, the terminal is not aware of a circumstance in which the capability of the current network is changed and sends the service request to the network for "small data transmission," the terminal will be rejected on the request by the network. Therefore, such circumstance causes a result of wasting a resource between the terminal and the network.

4) An Exemplary Embodiment in which an Incompatible Setting is Generated among the MTC Features of the Network and the Terminal is not Aware of Such Network State It is assumed that the terminal registers the following MTC features with the network and these MTC features are currently supported by the network: "Low Mobility," "Time Control," "Time Tolerant," "Group Based Charging," "PS Only," "Small Data Transmission," "Frequent data transmission," "Infrequent mobile terminated," "Priority alarm," etc.

Here, in the network's position, an incompatible setting in which some among the MTC features may not be used together may be generated. Namely, for example, it is assumed that an MTC feature of "time control", which is characterized to be able to transmit a data only within a predetermined time interval, is set to transmit the data in only a 1-2 minute interval during a day time in a corresponding network, whereas an MTC feature of "frequency data transmission," which is capable of transmitting a data very frequently, is set to be able to transmit a data every hour. Under this assumption, the two MTC features of "time control" and "frequent data transmission" may be considered as the incompatible setting of the MTC features because, although the two MTC features may be used by the current network, the two MTC features may not be used at the same time. The incompatible setting of the MTC features as above may be generated under an influence of a terminal support capability, a network support capability, subscriber information, or an MTC service to be serviced. Also, when the terminal requests the service to the network in a circumstance where the terminal is not aware of the incompatible MTC features, the network may reject the service request based on, for example, preset information or an operator policy. A rejection to the service request by the network eventually causes waste of the network resource. In other words, if the terminal is aware of the incompatible MTC features of the current network, the terminal has lower probability of sending an unnecessary service request such as a service request which is certainly to be rejected.

As described above, in the circumstance of 1) through 4), if the terminal is not accurately aware of the network state, the terminal may attempt a service request, which is inevitably rejected or is likely to be rejected, to the network. This eventually increases a load on the network in regard to the MTC service, thereby causing the waste of the network resource.

Therefore, the present invention suggests a method of preventing the waste of the network resource by receiving changed information of the MTC feature according to a circumstance change of the network and not requesting for a service which is certain to be rejected based on the received information.

In an exemplary embodiment of the present invention, the terminal and/or the network (e.g., a core network node) update and generate a changed content of the MTC features. Also, in the present invention, based on whether MTC features which are registered when the terminal (i.e., MTC device) is subscribed are activated, a network condition (i.e., a home network condition and a visited network condition), and an operator policy, the terminal may not request an unnecessary service. As a result, the overload of the network in an MTC environment may be efficiently managed.

Exemplary embodiments of the present invention may be classified, according to a subject, into an operation of the terminal and an operation of the network node: first, operations performed, in the terminal's position, for preventing an unnecessary service request by the terminal; and operations performed, in the network's position, for preventing by the network node an unnecessary service request by the terminal First, operations performed in the terminal's position in order to prevent an unnecessary service request to the network are as follows.

(1) The terminal verifies an activation/deactivation state currently set for each MTC feature. Here, there may be several basis of verifying the activation/deactivation state currently set for each MTC feature. For example, ① a result of rejection or acceptance (i.e., information included in S10 of FIG. 2) obtained from a previous service request of the terminal to the network node is stored in the storage unit (13 of FIG. 4) and, based on the stored result, the activation/deactivation state of the MTC features may be known. Alternatively, ② when the terminal receives an accept message or a reject message from the network node with respect to the service request of each MTC feature, a direct cause or direct/indirect other information may be received together from the network node, thereby allowing for reasoning of the cause. In other words, explicitly, an activation list of the MTC features may be received or an inactivation list of the MTC features may be received. Alternatively, ③ for example, from HSS or a server which stores information about MTC features set for each terminal, the terminal may be provided with the stored information about the MTC features using a method such as OMA DM/DT.

On the other hand, the activated MTC feature refers to an MTC feature which is set, for example, when the terminal is registered and subscribed to the MTC server, and is activated at a specific time or upon generation of an event. In other words, the activation state of a specific MTC feature means a state in which intent to receive the service exists or a state in which the service can be provided. On the other hand, even if the terminal is subscribed to an MTC system (or specifically, for example, MTC server), if the specific MTC feature is in the inactivation state due to a network operator policy or by a condition of other network, the terminal cannot receive the service with respect to the currently inactivated MTC feature.

(2) The terminal determines whether to send the service request of the specific MTC feature to the network node More specifically, the terminal (for example, control unit (or processing unit), which is an element of the terminal) determines (verifies) whether capability associated with the MTC feature is supportable by the terminal and determines (verifies) whether a corresponding MTC feature is activated according to current subscription information. Thus, since the terminal determines whether to send the service request to the network node based on determination of the capability and the current subscription information, in the terminal's position, a service request which is certain to be rejected may not be sent.

(3) On the other hand, when the terminal sends the service request to the network node, at least one of the following information related to the MTC features of the terminal may be included to be sent to the network node:
  MTC features the terminal wants to activate;
  MTC features in the activation state currently stored in the storage unit of the terminal;
  device capability currently supportable by the terminal and/or corresponding MTC features; and
  user preference which is preset or dynamically selected
  (for example, preference information of preferentially selecting the specific MTC feature).

(4) The terminal sends the service request of the specific MTC feature to the network node, and after receiving the accept message or the reject message from the network with respect to the request, related information is stored. Thus, the stored information can be used when it is determined whether the terminal sends the service request to the network node.

Second, operations performed in the position of the network in order to prevent an unnecessary service request from the terminal are as follows:

(1) The network node receives the request service from the terminal (i.e., MTC device).

(2) Upon receiving the service request from the terminal, the network node determines whether to activate each MTC feature by considering the network state, etc. Here, information considered by the network node in determining whether to activate the MTC features are as follows: i.e., information included by the terminal in the service request to the network, as described above; information indicating the network state, the subscriber information, the operator policy (for example, information on the operator policy obtained by a request/response manner such as pre-configuration information or PCRF interaction).

(3) The network node informs the terminal of a result indicating the activation state of the MTC features (e.g., a list of activation states of the MTC features). Namely, the network node includes the result in the accept message or the reject message or, for example, the network node may send the result to the terminal from the HSS or a server which stores information about the MTC features set for each MTC device by using methods such as OMA DM/DT.

On the other hand, the result indicating the activation state of the MTC features sent by the network node to the terminal may be implemented in various ways.

Namely, for example, an activation list of the MTC features supportable and set by the network node;
  or, a deactivation list of the MTC features of the network;

a list of MTC features the terminal can (or need to) activate and/or a list of MTC features the terminal can (or need to) deactivate;

incompatible setting and/or a parameter value of a corresponding MTC feature for avoiding the incompatible setting;

information in a form of "each MTC feature +on/off flag"; or updated information if there exists a previously provided information.

As described above, in order to reduce the network overload and improve the efficiency of the network resource, in the present invention, the terminal and the network node respectively perform corresponding steps. Since the terminal does not send the service request to the network node unconditionally but sends the service request by comprehensively considering the capability of the terminal of its own, a state of the MTC features that are currently activated sent from the network node, etc., the service request which has a high probability to be rejected by the network is not performed. Therefore, in terms of the network resource, by not sending the service request which has the high probability to be rejected by the network, the efficiency of network resource may be improved as well as avoiding the network overload.

Hereinafter, exemplary embodiments of the present invention will be described in detail with reference to FIG. 2 and FIG. 4.

Figure 2:
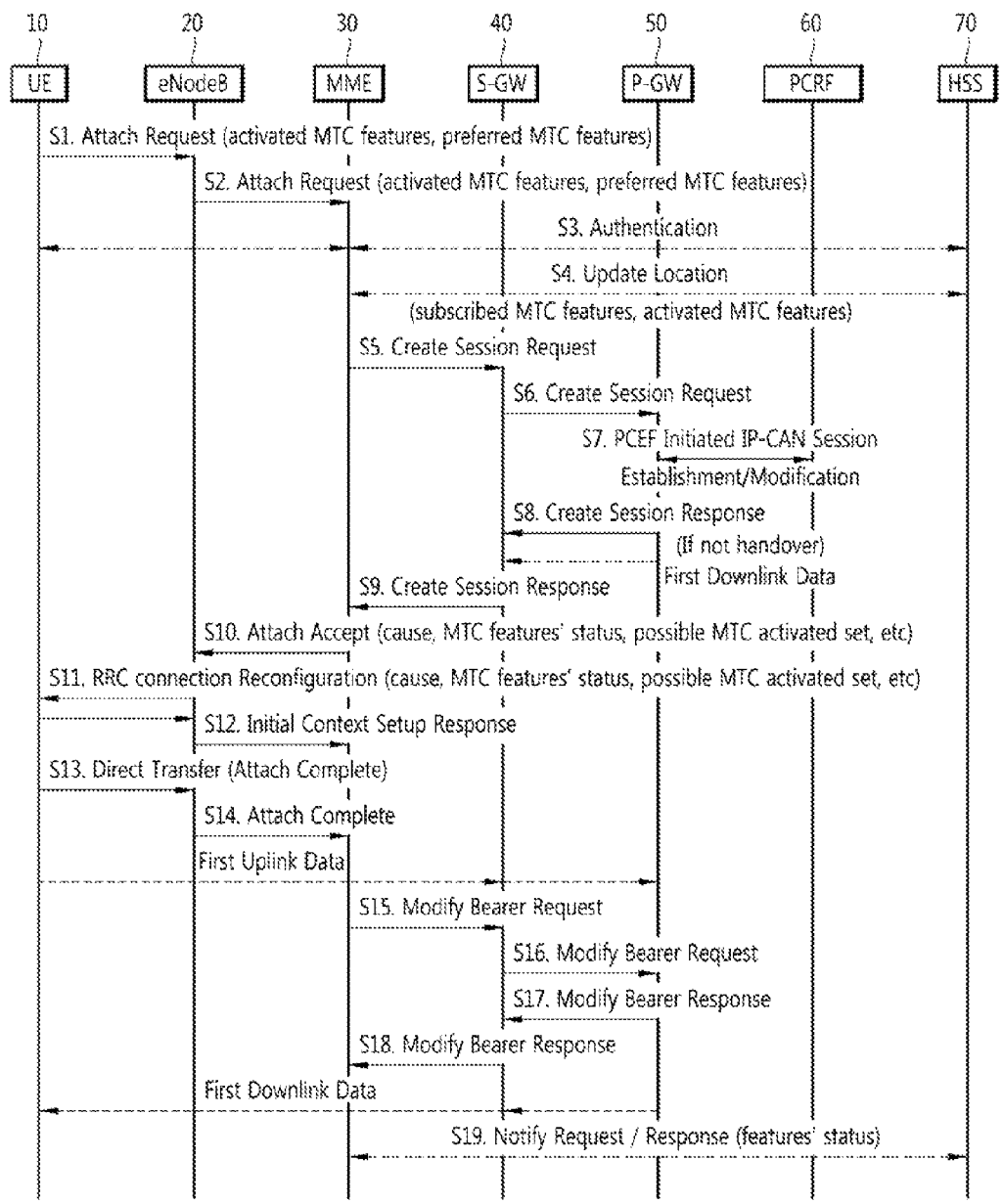
FIG. 2 is a signal flow view illustrating a first exemplary embodiment of a method of controlling a network overload in an MTC service of a mobile communication system according to the present invention.

FIG. 2 is a signal flow view illustrating a first exemplary embodiment of a method of controlling a network overload in an MTC service of a mobile communication system according to the present invention.

Figure 3:
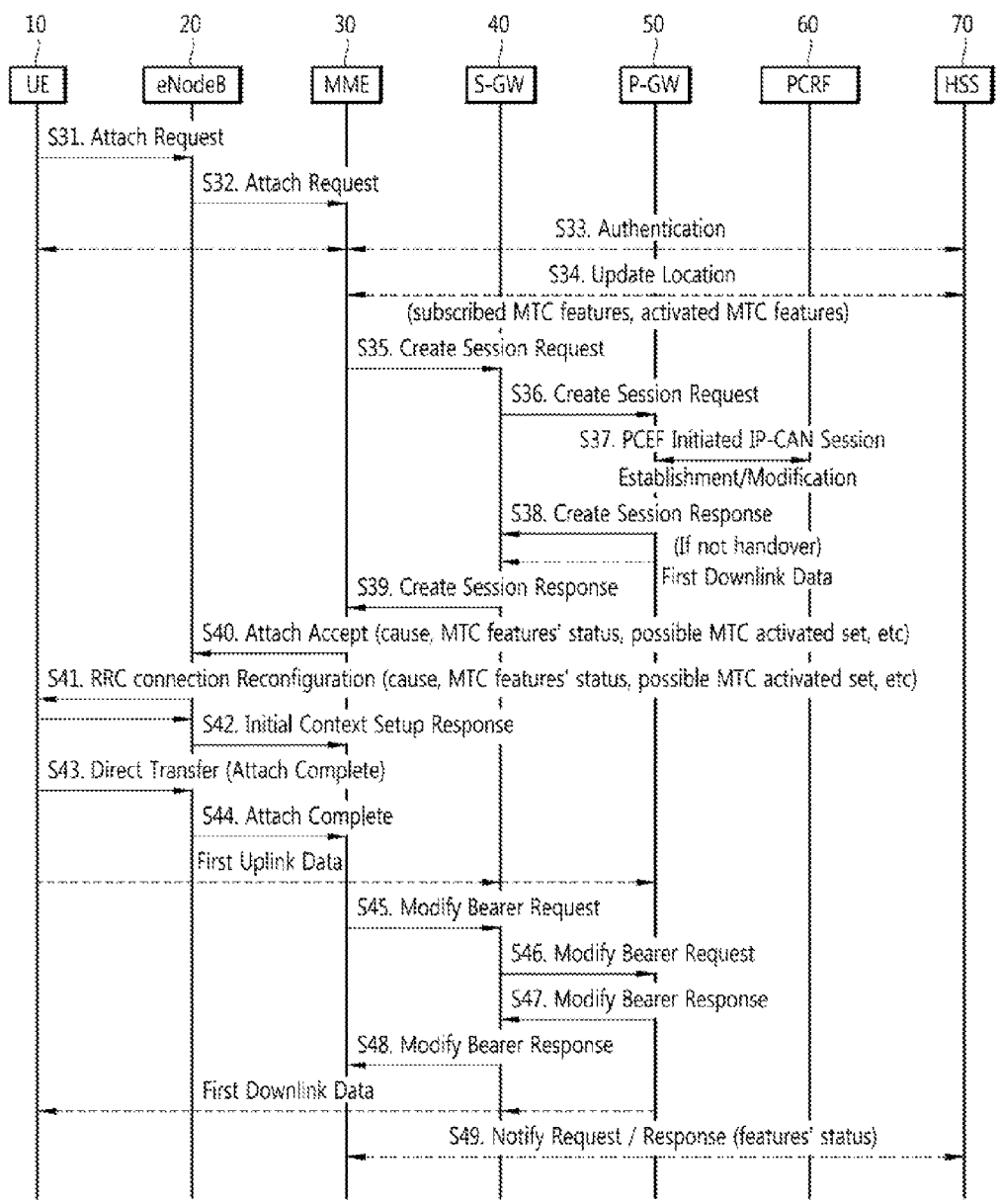
FIG. 3 is a signal flow view illustrating a second exemplary embodiment of a method of controlling a network overload in an MTC service of a mobile communication system according to the present invention.

FIG. 3 is a signal flow view illustrating a second exemplary embodiment of a method of controlling a network overload in an MTC service of a mobile communication system according to the present invention.

Figure 4:
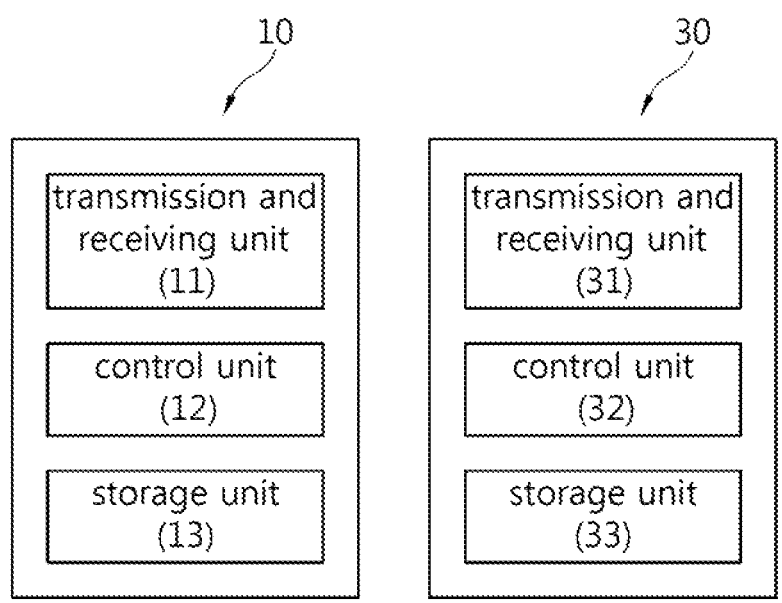
FIG. 4 is a schematic configuration view illustrating an exemplary embodiment of a terminal and a network node of the present invention.

FIG. 4 is a schematic configuration view illustrating an exemplary embodiment of a terminal and a network node of the present invention The exemplary embodiments of FIG. 2 and FIG. 3 illustrate a procedure of the terminal to send an attach request to the network node. In FIG. 2 and FIG. 3, UE 10, eNodeB 20, MME 30, S-GW 40, P-GW 50, PCRF 60 and HSS 70 are illustrated.

The exemplary embodiment of FIG. 2 and the exemplary embodiment of FIG. 3 are only an example illustrating a method of controlling the network overload by using the attach procedure, and the network overload may be further controlled according to the present invention by using a message of a location registration procedure such as the TAU/RAU or a method of controlling the network overload of the present invention may be applied to other service request procedure after the terminal is attached to the network. In addition, in the method of controlling the network overload according to the present invention, a specific service request procedure may be used such as the SMS, and in this case, an MTC related parameter may be added.

A difference between the exemplary embodiment of FIG. 2 and the exemplary embodiment of FIG. 3 is that, the terminal determines whether to send an attach request message to the network in the exemplary embodiment of FIG. 2, and here, the attach request message includes the list of the MTC features that are activated. However, the exemplary embodiment of FIG. 3 will be described in detail below in comparison with the exemplary embodiment of FIG. 2.

Hereafter, referring to FIG. 4, a signaling related to the present invention among signaling of FIG. 2 will be described hereinafter.

As shown in FIG. 4, the terminal 10 includes a transmission and receiving unit 11, a control unit 12 and a storage unit 13. Also, the network node 30 includes a transmission and receiving unit 31, a control unit 32 and a storage unit 33. The terminal (UE, i.e., MTC device) 10, more specifically the control unit 12 of the terminal determines whether to send the attach request to the network node 30. In this case, the control unit 12 of the terminal 10 determines whether to send the attach request by considering information stored in the storage unit 13. When the control unit 12 determines whether to send the attach request.

Information read from the storage unit 130 and considered is as follows: i.e., a result of attach requests previously sent from the terminal 10 to the network, the subscription information, and, the capability of the terminal 10 to support the MTC feature.

When the control unit 12 of terminal 10 determines the attach request, the transmission and reception unit 11 of terminal 10 transmits the attach request message to the node 30 through a base station (eNodeB) (S1 and S2).

The control unit 12 of the terminal 10 may include in the attach request message information for controlling the network overload, e.g., information of activated MTC features currently known to the terminal, information of MTC features to be activated, and information of a device capability for providing the MTC features.

In summary, at least one of

MTC features the terminal 10 wants to request to activate;

MTC features in the activation state currently stored in the storage unit of the terminal 10;

device capability currently supportable by the terminal 10 and/or corresponding MTC features; and user preference (or terminal preference, user/UE preference) which is preset or dynamically selected (for example, preference information of preferentially selecting the specific MTC feature) may be included in the attach request message.

Through the interaction with the HSS and the network node (MME) 30 (i.e., the MME is a kind of a network control node), the subscriber information is brought to the network node 30 (S3 or S4). Here, the interaction may be an authentication process (S3) in FIG. 2 or a location update process (S4). For illustrative purposes, it is assumed that the subscription information may be obtained by the network node 30 from the HSS 70 through the process of S4.

The subscription information of the process of S4 may include information of the MTC service to which the terminal is subscribed, information of the MTC features, information of MTC features currently activated, and information of deactivated MTC features.

On the other hand, the control unit 32 of the network node 30 may determine MTC features to be finally activated (or MTC features to be finally deactivated) by considering: ① information about network overload control received from the terminal through steps S1 and S2 (for example, the MTC features activated in the terminal, the MTC features preferred by the terminal to be activated); ② the subscriber information obtained through step S4; and network information collected by the network node (30) (e.g., information received from a third network node (not shown)); and ④ operator policy received from pre-configuration or PCRF. The control unit 32 of the network node 30 may generates the list of the MTC features to be activated (or MTC features to be deactivated).

After processes of S5-S9, if the network node 30 accepts (permits) the attach requested by the terminal 10, the network node 30 sends the attach accept message to the base station 20

(S10 and S11) thereby allowing a series of processes (S11-12) to be performed. Here, in order to prevent the overload of the network due to a subsequent unnecessary service request by the terminal, a transmission and receiving unit 31 of the network node 30 may transmit the list of the MTC features to be activated (or the MTC features to be deactivated) determined and generated by the controller 31 of the network node 30 to the MTC terminal 10. Also, the network node 30 may transmit, to the terminal 10, information indicating a current state of the MTC feature, information of "cause" indicating a reason for accepting or rejecting a reason for the service request of the terminal 10, and information indicating a set of MTC features that can be currently activated by the network node 30. The information transmitted by the network node 30 to the terminal 10 is used when the terminal 10 later determines whether to request the service to the network node 30. In other words, by determining the service request to the network node 30 by the controller 12 of the terminal 10 based on the information received through S10 and S11, the terminal 10 knows that the network node 30 is to reject the service request sent thereby so that, in the position of the terminal 10, the terminal 10 may not perform an unnecessary operation and, in the position of the network node 30, the overload of the network may be prevented.

3. On the other hand, the same applies to a case where the network node 30 transmits the reject message in response to the attach request of the terminal 10. More specifically, in a procedure of performing the service request (for example, the attach request) of the terminal 10, when the network node 30 determines rejection in a specific step by considering the network state, the subscriber information, etc., the reject message may be sent to the terminal 10 instead of sending the attach message to the terminal 10. Here, the network node 30 may send a particular "cause" (i.e., information indicating a reason for rejection) as well as information indicating a state of the MTC feature which is currently activated. Also, when sending the reject message due to a circumstance in which an incompatible specific MTC feature is difficult to provide, the network node 30 provides detailed information such as a list of the incompatible MTC feature to the terminal 10 such that the terminal 10 may not repeatedly perform the service request which is certain to be rejected. Therefore, when the terminal 10 requests the service later, a service request which avoids generation of the incompatible setting of the MTC feature may be sent to the network node 30.

On the other hand, a form of the result indicating the activation status of the MTC features sent to the terminal 10 together with the accept message or reject message may be implemented in various ways as described above.

Namely, for example, the activation list of the MTC features supportable and set by the network node;
or, the deactivation list of the MTC features of the network;
the list of MTC features the terminal can (or need to) activate and/or a list of MTC features the terminal can (or need to) deactivate;
incompatible setting and/or a parameter value of a corresponding MTC feature for avoiding the incompatible setting;
information in a form of "each MTC feature+on/off flag"; or
updated information if there exists a previously provided information.

On the other hand, information transmitted from the network node 30 to the terminal may be transmitted to the terminal 10 through a different path (e.g., OMA DM/DT) instead of through the accept message or the reject message. For example, the network node 30 may update the activation state of the MTC feature to the HSS 70 or the server (e.g., MTC server) which stores the subscription information (S19) and, at a specific time point or upon generation of a set event, information related to the MTC feature (e.g., information for controlling the network overload) may be provided to the terminal 10 through the different path such as OMA DM/DT.

In the second exemplary embodiment of FIG. 3, when compared with the exemplary embodiment of FIG. 2, the attach request message of the terminal 10 does not include the information (e.g., the activated MTC features) for controlling the network overload or the MTC features preferred by the terminal (S31 and S32). The processes of S33-39 are the same as S3-S9 of FIG. 2.

Therefore, in the second exemplary embodiment of FIG. 3, the terminal 10 may receive information (e.g., "cause", "status of MTC features," or "set of the MTC features that can be currently activated") for controlling the network overload transmitted from the network node 30 (S40 and S41) and determine whether to request the service to the network node 30 later by considering the received information. Meanwhile the processes of S42-49 are the same as S12-S19 of FIG. 2. Additionally, an operation and a function of each signaling in the second exemplary embodiment of FIG. 3 is the same as an operation corresponding to the first exemplary embodiment of FIG. 2, and thus, for a detailed description of the second exemplary embodiment of FIG. 3, a quotation to the description of the first exemplary embodiment of FIG. 2 may be used.

Meanwhile, a method according to the present invention described herein may be implemented in a software, a hardware, or a combination thereof. For example, a method according to the present invention may be implemented in codes or commands within a software program which can be stored in a storage medium (for example, an internal memory, a flash memory, a hard disk, etc., of a mobile terminal) and executed by a processor (for example, an internal microprocessor of the mobile terminal).

The above-described embodiments include various aspects of examples. Although all possible combinations for describing the various aspects may not be described, those skilled in the art may appreciate that other combinations are possible. Accordingly, the present invention should be construed to include all other replacements, modifications, and changes which fall within the scope of the claims.

What is claimed is:

1. A method of controlling a network overload in a mobile communication system, the method comprising:
   receiving and storing, by a terminal, information about a control of the network overload from a network node;
   determining, by the terminal, whether a service request to the network node is to be rejected or accepted by analyzing the stored information about the control of the network overload; and
   transmitting, by the terminal, a message requesting a service to the network node when it is determined that the network node is to accept the service request,
   wherein the information about the control of the network overload includes information indicating an activation state of machine type communication (MTC) features associated with the terminal.

2. The method of claim 1, wherein the information about the control of the network overload comprises at least one of:
   a list of activation of MTC features supportable by the network node with respect to the terminal;
   a list of deactivation of the MTC features of the terminal by the network node;

a list of MTC features the terminal is capable of or need to activate or a list of MTC features the terminal is capable of or need to deactivate;

an incompatible setting among the MTC features of the terminal;

a parameter value of a corresponding MTC feature for avoiding the incompatible setting among the MTC features of the terminal;

information in a form of combination of each MTC feature and an on/off flag, among the MTC features of the terminal; and if information previously transmitted to the terminal by the network node exists, updated information of a corresponding information.

3. The method of claim 1, wherein the message requesting the service comprises at least one of:

information about MTC features the terminal wants to activate;

information about MTC features in an activation state currently stored in the terminal;

information about a device capability currently supportable by the terminal and/or information about corresponding MTC features; and information about user preference for the MTC features of the terminal.

4. A method of controlling a network overload in a mobile communication system, the method comprising:

receiving, by a network node, a message requesting a service from a terminal;

receiving, by the network node, information about machine type communication (MTC) features of the terminal from a subscriber registration server;

determining, by the network node, whether to reject or accept a service request of the terminal by considering the received information about the MTC features of the terminal, a network condition, and an operator policy; and transmitting, by the network node, a message of accepting or rejecting the service request together with information about a control of the network overload to the terminal, based on the determination.

5. The method of claim 4, further comprising:

generating, by the network node, the information about the control of the network overload by considering the received information about the MTC features of the terminal, the network condition, and the operator policy.

6. The method of claim 5, further comprising:

updating the information about the control of the network overload generated by the network node to the subscriber information server.

7. The method of claim 4, wherein the information about the control of the network overload comprises:

a list of activation of MTC features supportable by the network node with respect to the terminal;

a list of deactivation of the MTC features of the terminal by the network node;

a list of MTC features the terminal is capable of or need to activate or a list of MTC features the terminal is capable of or need to deactivate;

an incompatible setting among the MTC features of the terminal;

a parameter value of a corresponding MTC feature for avoiding the incompatible setting among the MTC features of the terminal;

information in a form of combination of each MTC feature and an on/off flag, among the MTC features of the terminal; and if information previously transmitted to the terminal by the network node exists, updated information of a corresponding information.

8. The method of claim 4, wherein the message requesting the service comprises at least one of:

information about MTC features the terminal wants to activate;

information about MTC features in an activation state currently stored in the terminal;

information about a device capability currently supportable by the terminal and/or information about corresponding MTC features; and information about user preference for the MTC features of the terminal.

9. The method of claim 4, wherein the terminal is an MTC device capable of supporting an MTC service, and the network node is a mobility management entity (MME), a serving GPRS support node (SGSN), or a mobile telephone switching (MSC).

10. A mobile communication terminal comprising:

a transmission and receiving unit configured to request a service to a network node and configured to receive, from the network node, information about a state of machine type communication (MTC) features, information about a cause for rejection to a request for the service, and information about MTC features currently capable of being activated;

a storage unit configured to store the information about the state of MTC features, the information about the cause for rejection to the request for the service, and the information about the MTC features currently capable of being activated, received from the network node; and a controller configured to control a network overload by determining whether to request the service to the network by considering the received information such that the network overload is not generated.

* * * * *